April 10, 1928.
T. A. MOORE
1,665,559
CULTIVATOR
Filed March 5, 1927
4 Sheets-Sheet 3
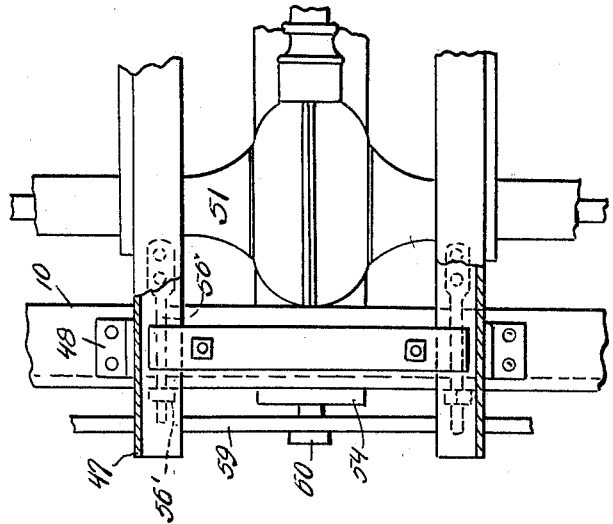
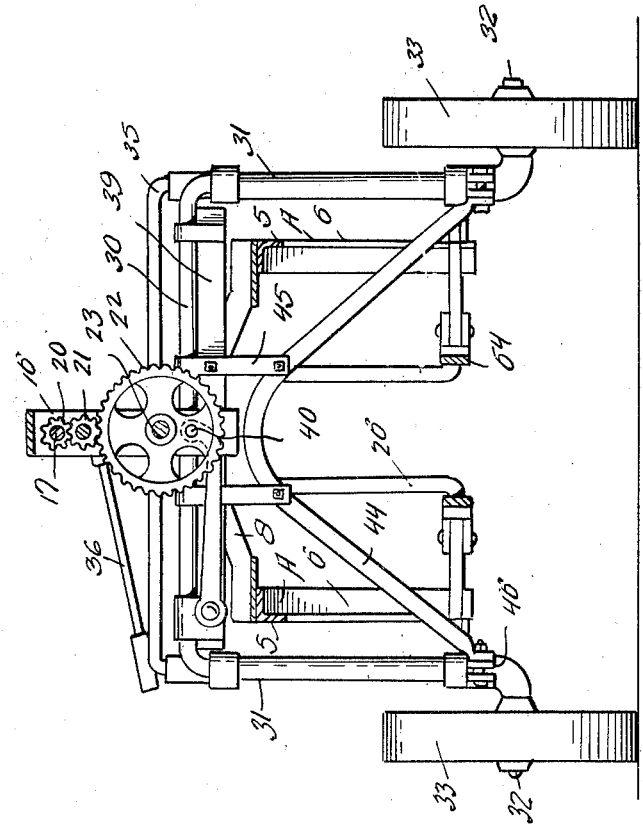
Inventor
T. A. Moore,
By Clarence A. O'Brien
Attorney April 10, 1928.
T. A. MOORE
1,665,559
CULTIVATOR
Filed March 5, 1927
4 Sheets-Sheet 4
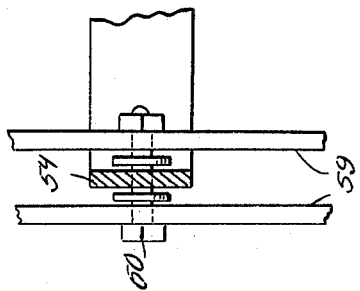
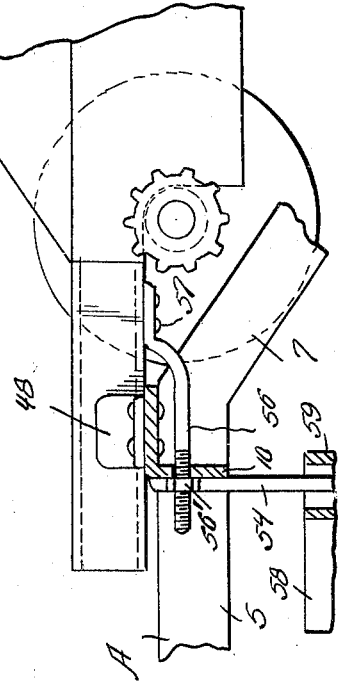
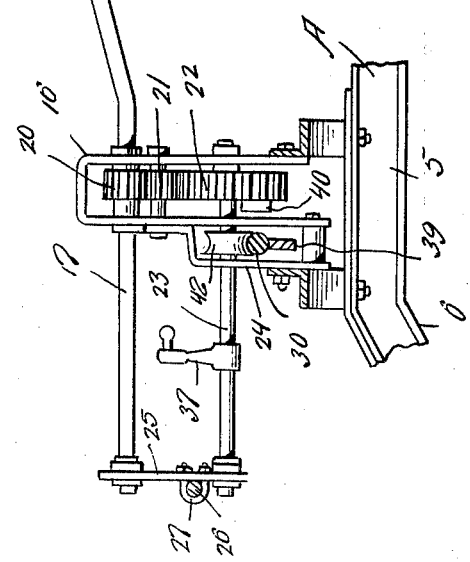
Inventor
*T. A. Moore.*
By *Clarence A. O'Brien*
Attorney Patented Apr. 10, 1928.

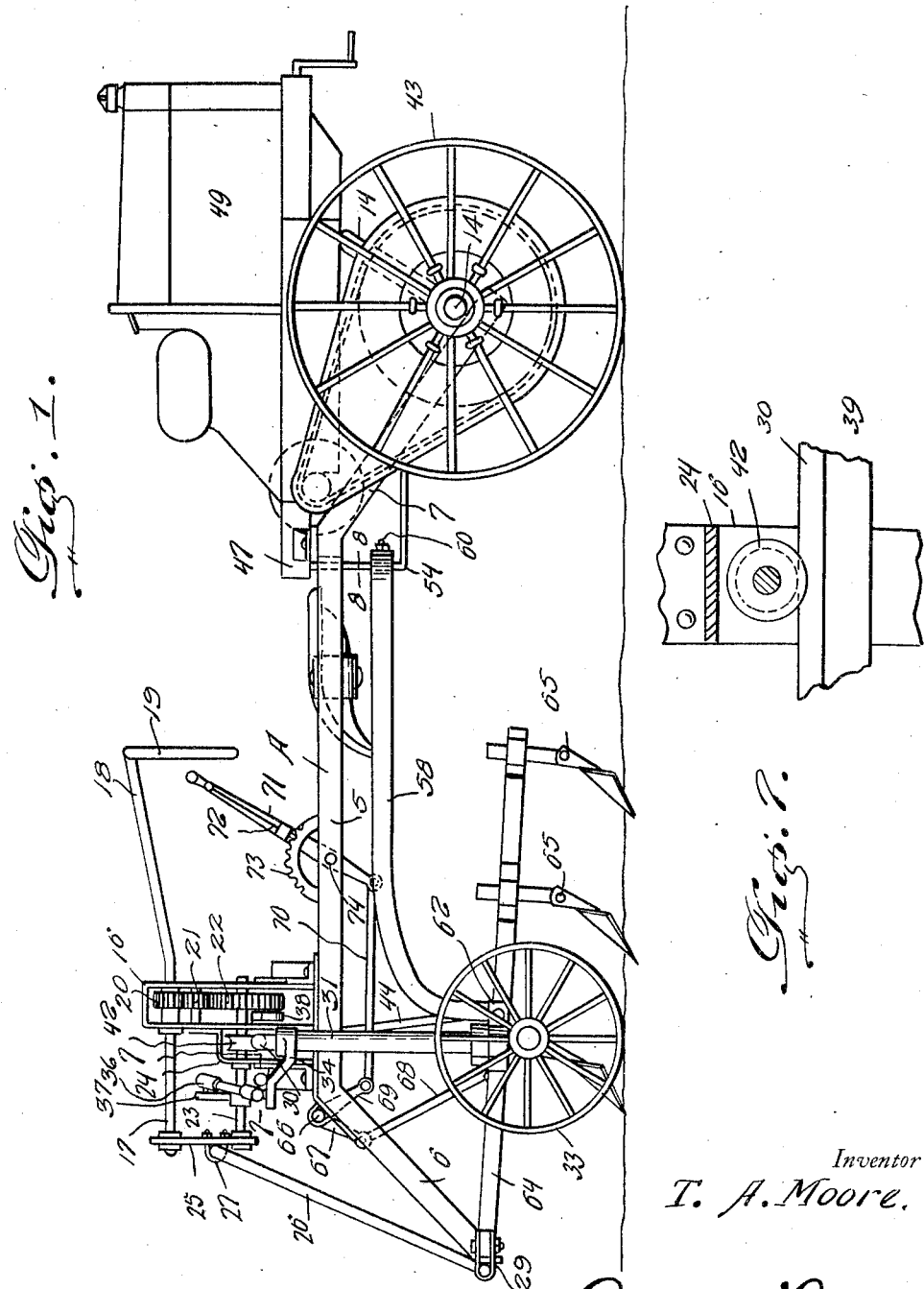

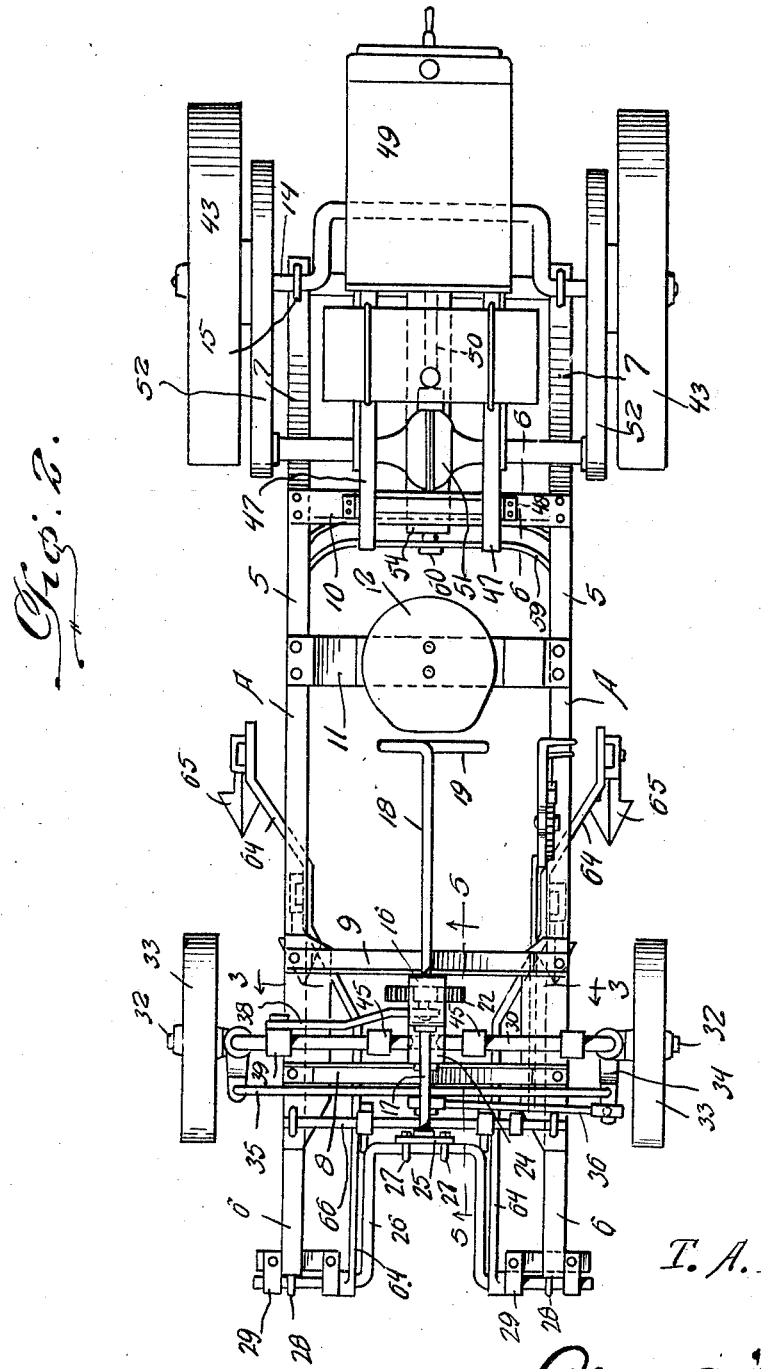

1,665,559

UNITED STATES PATENT OFFICE.

THOMAS A. MOORE, OF ELDON, IOWA.

CULTIVATOR.

Application filed March 5, 1927. Serial No. 173,065.

The present invention relates to a cultivator of the motor driven type and has for one of its important objects to provide a machine of this nature, wherein the driver thereof is seated in a position where he may have a full, unobstructed view of the cultivating implements, so as to follow them in their operations.

Another very important object of the invention lies in the provision of a machine of this nature, embodying a steering mechanism which when operated to steer the machine to the right or to the left will cause the shifting of the main frame to the right or to the left respectively.

A still further very important object of the invention lies in the provision of a cultivator of this nature which is motor driven and has the driving mechanism located to the rear of the main frame and behind the driver.

Another very important object of the machine lies in the provision of an exceedingly simple structure, that may be manufactured at a reasonably low cost and will prove thoroughly efficient and reliable in operation, easy to manipulate and control, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

In the drawing:

Figure 1 is a side elevation of the machine embodying the features of my invention.

Figure 2 is a top plan view thereof.

Figure 3 is a vertical transverse section, taken substantially on the line 3—3 of Figure 2, looking forwardly.

Figure 4 is a fragmentary sectional top plan view, of a rear portion of the machine.

Figure 5 is an enlarged detail longitudinal section taken vertically substantially on the line 5—5 of Figure 2.

Figure 6 is an enlarged detail longitudinal section taken vertically on the line 6—6 of Figure 2.

Figure 7 is an enlarged detail section, taken substantially on the line 7—7 of Figure 1, and Figure 8 is an enlarged detail horizontal section taken substantially on the line 8—8 of Figure 1.

Referring to the drawing in detail, it will be seen that the main frame includes a pair of spaced parallel side beams A, the intermediate portions of which are straight and horizontal as is indicated at 5. The forward ends of these intermediate portions merge into downwardly and forwardly inclined extensions 6, while the rear ends merge into downwardly and rearwardly inclined extensions 7. The beams A are connected by cross bars 8, 9, and 10, and also by a saddle 11, supporting a driver's seat 12, which is disposed forwardly of the rear of the intermediate portions 5 and to the rear of the centers thereof. A rear axle 14 is fixed to the extremities of the extensions 7, by suitable means 15, or in any other preferred manner. The intermediate portion of this axle 14 is of an inverted U-shaped formation which inclines upwardly and rearwardly. A gearing frame 16 rises from the centers of cross bars 8 and 9. The shaft 17 is journaled horizontally through the upper portion of the frame 16, and the rear portion of this shaft inclines upwardly as at 18 and terminates in a loop 19, the plane of which is vertical. This loop 19 forms the steering wheel and is situated immediately in front of the driver's seat 12 as is apparent from an inspection of Figures 1 and 2. A gear 20 is fixed to the shaft 17, within the frame 16 and meshes with an idler gear 21, journaled in the frame, immediately below the gear 20. The idler gear 21 meshes with a driven gear 22, which is disposed in the frame below the gear 21 and is fixed on a shaft 23, which projects forwardly from the frame 16 and also through an auxiliary frame 24, on the front of the steering gear frame 16. A plate 25 is disposed vertically and has the forward ends of shafts 17 and 23 journaled therein. An inverted U-shaped brace 26 has its bight portion secured to the plate 25, by a U-bolt 27, or in any other suitable manner. The lower extremities of this brace 26 are extended outwardly and laterally, to be engaged with the forward extremities of the extensions 6 by clamps 28 and 29. A cross bar 30 has downwardly disposed extensions terminating in sleeves 31, which are disposed vertically one to each side of the main frame. Steering knuckles 32 are disposed in the lower extremities of the sleeves 31 and have journaled thereon front wheels 33. Arms 34 project forwardly from the steering sleeves 31 and are connected together by link 35. A rod 36 is engaged with the left hand arm 34 and is also engaged with a crank 37 on the driven shaft 23. A rod 38 is engaged with one end of the bar 30 by a clamp 39, and is engaged with an eccentrically mounted pin 40 on the driven gear 22. When the wheels are disposed in a straight ahead position as is shown in Figure 2, it will be seen that the eccentrically mounted pin is disposed vertically below the axis of the shaft 23 and the crank 37 is pointing upwardly and vertically and the arms 34 are directed straight ahead. A roller 42 is mounted on the shaft 23, within the auxiliary frame 24 and rides on the bar 30. Wheels 43 are journaled on the extremities of the rear axle 14. Now from the description as it has thus far progressed, it will be seen that if the steering wheel 19 is rotated to steer the machine to the right, the main frame will also be shifted to the right, because of the action of rod 38, in association with the pin 40 on the gear 22, and the engagement of this rod with the bar 30. The main frame will move to the right with a minimum amount of friction because of the roller 42 which will ride on the bar 30.

It will be further seen that if the steering mechanism is actuated to steer the machine to the left, the main frame will be shifted to the left in the same manner. It is to be noted that the arms 34 are preferably mounted at the upper ends of the sleeves 31 and the sleeves 31 turn with the steering knuckles, on the downwardly directed extremities of the bars 30. The lower ends of the sleeves 31 and the steering knuckles are properly braced by an inverted V-shaped brace structure 44, the center portion of which is connected to straps 45, which are bent about the bar 30. The extremities of the brace 44 are secured to the steering knuckles through straps 46.

An engine supporting frame includes a pair of beams 47, slidable between brackets 48 fixed on the cross bar 10, so as to be spaced inwardly from the side beams A. These beams 47 project rearwardly and rest on the bights of the inverted U-shaped center portion of the rear axle 14. An engine 49 is mounted at the rear ends of the beams 47 and has a driving connection 50 with a differential and axle shaft 51 of conventional construction, disposed forwardly of the engine and suitably secured to the beams 47. A chain and sprocket drive mechanism 52 is associated with each end of the mechanism 51 and the corresponding drive wheel 43.

A bracket 54 of L-shaped formation has the upper end of its vertical portion fixed to the bar 10. The horizontal lower portion of this bracket 54 extends rearwardly and is secured in any suitable manner to the rear axle. A radius rod structure 58 of U-shaped formation has a double bight portion indicated by the numeral 59, which extends horizontally below the main frame and straddles the vertical arm of the bracket 54, and is loosely connected therewith by a bolt 60. The forward extremities of the U-shaped radius rod structure 58 are curved downwardly and secured by clamps 62 to the lower ends of the sleeves 31. Thus, this radius rod structure 58 allows the shifting of the main frame as the machine is steered.

Bolts 56 are fixed to the beams 47 and project forwardly through openings in the bar 10. Nuts 56' are threaded on the bolts 56 to engage the bar 10 so that the engine frame may be moved forwardly by screwing the nuts on the bolts thereby tightening chain drives 7.

Implement beams 64 are rockable at their forward ends on the lateral extensions of the brace 26, as is clearly seen in Figure 2, and project rearwardly therefrom, and are preferably shaped in an angular manner at their rear ends, so that cultivating implements 65 and the like may be secured thereto in lateral stepped relation. A shaft 66 is journaled across the upper portions of the extensions 6 of the side beams A and have cranks 67 thereon with connecting rods 68 pivotally engaged with their ends and pivotally engaged with intermediate portions of the implement beams 64. A crank 69 is fixed to the shaft 66 and has engaged therewith a connecting rod 70. A lever 71 has a suitable detent structure 72 mounted thereon for engaging a rack segment 73 on the left hand side beam A, upon which the intermediate portion of the lever 71 is pivoted as at 74. The connecting rod 70 is engaged with the lower extremity of this lever 71. It will be quite apparent that by rocking the lever 71, the rear ends of the implement beams 64 may be lowered and raised, as desired, and held in different adjusted positions because of the detent 72 and the rack segment 73. This lever 71 is located in a convenient position to be manipulated from the driver's seat 12.

From the above detailed description, it will be seen that the operator in the seat 12 may conveniently and accurately control the cultivator. He is in the same relative position to the gangs of implements 65 as is commonly employed in the one row horse drawn cultivator, the motor and transmission mechanism being behind him to the rear of the machine and thus not interfering with his view of the work. It will further be seen that the combination of shifting the machine frame laterally on the front axle structure in conjunction with the pivoting of the front wheels as a gang shifting and tractor steering mechanism is very important, as this mechanism makes it possible for the attaching of the load directly to the main frame, thus bringing the combination of simplicity and strength into play. The drive and engine mechanism used are parts of the well-known Ford automobile, which enables the machine to be constructed at a relatively low cost. The importance of the shifting of the frame simultaneous with the steering of the machine will be appreciated by noting that the rear wheels will not pass over the ground which is dug up by the cultivating implements when the machine is making a turn as would be the case if the frame did not shift in the direction of the turn.

It is thought that the construction, operation, and advantages of this machine will now be quite apparent to those skilled in this art, without a more detailed description thereof. The present embodiment of the invention has been disclosed in detail merely by way of example, since in actual practice, it attains the features of advantage enumerated as desirable in the statement of the invention and the above description. It will be apparent that changes in the details of construction, and in the combination and arrangement of parts may be resorted to, without departing from the spirit or scope of the invention as hereinafter claimed or sacrificing any of its advantages.

Having thus described my invention, what I claim as new is:

1. A machine of the class described comprising a frame, rear wheels, means mounting the rear wheels on the rear of the frame, front wheels, steering knuckles for said front wheels, sleeves fixed to said steering knuckles and projecting therefrom vertically, a cross bar having downwardly extending ends at the tops of the sleeves, anti-friction means on the frame engaging said cross bar, an auxiliary frame rising from the first frame, a pair of horizontal shafts journaled in vertical spaced relation in the auxiliary frame, gearing between the shafts in the auxiliary frame, a roller on the lower shaft ridable on the cross bar, a crank on the lower shaft, a connecting rod engaged with the crank and engaged with the bar, a second crank on the lower shaft, a second connecting rod engaged with the second crank, and with a crank on one of the sleeves, a crank on the other sleeve, and a connecting rod between the two last mentioned cranks.

2. A machine of the class described comprising a frame, rear wheels, means mounting the rear wheels on the rear of the frame, front wheels, steering knuckles for said front wheels, sleeves fixed to said steering knuckles and projecting therefrom vertically, a cross bar having downwardly extending ends at the tops of the sleeves, anti-friction means on the frame engaging said cross bar, an auxiliary frame rising from the first frame, a pair of horizontal shafts journaled in vertical spaced relation to the auxiliary frame, gearing between the shafts in the auxiliary frame, a roller on the lower shaft ridable on the cross bar, a crank on the lower shaft, a connecting rod engaged with the crank and engaged with the bar, a second crank on the lower shaft, a second connecting rod engaged with the second crank and with a crank on one of the sleeves, a crank on the other sleeve, and a connecting rod between the two last mentioned cranks, a seat, means for supporting the seat in the center of the first frame, and drive means on the rear of the first frame for the rear wheels.

In testimony whereof I affix my signature.

THOMAS A. MOORE.